(12) United States Patent
Henderson

(10) Patent No.: US 9,208,167 B1
(45) Date of Patent: Dec. 8, 2015

(54) DISTRIBUTED DATA SYNCHRONIZATION AND CONFLICT RESOLUTION

(71) Applicant: Edifire LLC, Boston, MA (US)

(72) Inventor: Dagan Henderson, Roseville, CA (US)

(73) Assignee: EDIFIRE LLC, Boston, MA (US)

(*) Notice: Subject to any disclaimer, the term of this patent is extended or adjusted under 35 U.S.C. 154(b) by 0 days.

(21) Appl. No.: 14/477,752

(22) Filed: Sep. 4, 2014

(51) Int. Cl.
G06F 17/30 (2006.01)
H04L 29/08 (2006.01)

(52) U.S. Cl.
CPC .... G06F 17/30174 (2013.01); G06F 17/30171 (2013.01); G06F 17/30345 (2013.01); H04L 67/28 (2013.01)

(58) Field of Classification Search
CPC .................. G06F 17/30575; G06F 17/30174; G06F 17/30171
USPC ........................................................ 707/611
See application file for complete search history.

(56) References Cited

U.S. PATENT DOCUMENTS

| | | | |
|---|---|---|---|
| 7,353,227 B2 | 4/2008 | Wu | |
| 8,352,870 B2 | 1/2013 | Bailor et al. | |
| 8,489,549 B2 | 7/2013 | Guarraci | |
| 8,493,892 B1 | 7/2013 | Do et al. | |
| 8,495,112 B2 | 7/2013 | Adkins et al. | |
| 8,572,022 B2 | 10/2013 | Hagan et al. | |
| 8,661,063 B2 | 2/2014 | Mason, Jr. et al. | |
| 2010/0082534 A1* | 4/2010 | Sagar et al. | 707/610 |
| 2014/0143220 A1 | 5/2014 | Foster | |
| 2014/0201145 A1 | 7/2014 | Dorman et al. | |

* cited by examiner

Primary Examiner — Huawen Peng
(74) Attorney, Agent, or Firm — Proskauer Rose LLP

(57) ABSTRACT

Described herein are methods, systems, and computer program products for data synchronization and conflict resolution in a distributed data storage system. A first data access node receives a first request to modify a data element and transmits a first lock event to each other node. A second data access node receives a second request to modify the data element at substantially the same time as the first request is received and transmits a second lock event to each of the other nodes. The system determines that the first node has priority to modify the data element. The first node modifies the data element and transmits a first unlock event to each other node. The second node determines whether the second request to modify conflicts with the prior modification and modifies the data element based upon the second request, if the second request does not conflict with the prior modification.

23 Claims, 6 Drawing Sheets

DISTRIBUTED DATA SYNCHRONIZATION AND CONFLICT RESOLUTION

FIELD OF THE INVENTION

This application relates generally to methods and apparatuses, including computer program products, for data synchronization and conflict resolution in a distributed data storage system.

BACKGROUND

Data synchronization and conflict resolution have long been a concern in the context of computerized file systems. When multiple users attempt to modify the same dataset at the same time, the file system must be capable of locking the dataset so that only one user at a time can perform the desired modification. Further, the file system must recognize whether the attempted modifications are in conflict with each other and determine an outcome that preserves the integrity of the datasets.

As distributed data storage systems such as cloud-based file repositories become more common, accessibility and availability of data to many different users is a primary focus. To support this objective, multiple versions of the same dataset or file are stored in several different physical and/or logical locations in a distributed data storage system. However, traditional data storage systems typically perform complicated, bandwidth-intensive procedures in order to keep the multiple file versions in sync—which results in less efficient synchronization and slower response time to file access and modification requests.

SUMMARY OF THE INVENTION

Therefore, there is a need for methods and systems to enable automatic and efficient data synchronization and conflict resolution across a number of data centers that service multiple, often simultaneous, modification requests relating to the same data. The methods and systems described herein provide the advantage of synchronizing data (e.g., files) across multiple data storage repositories and resolving conflicts arising from requested changes to the data in a real-time fashion and requiring very little additional bandwidth and computational resources.

The invention, in one aspect, features a computerized method for data synchronization and conflict resolution in a distributed data storage system, where the distributed data storage system comprises a plurality of data access nodes connected to each other and one or more data centers coupled to at least some of the data access nodes. A first data access node receives a first request to modify a data element stored in a data center and transmits a first lock event associated with the data element to each of the other data access nodes. A second data access node receives a second request to modify the data element at substantially the same time as the first request to modify is received and transmits a second lock event associated with the data element to each of the other data access nodes. The system determines that the first data access node has priority to modify the data element. The first data access node modifies the data element based upon the first request to modify and transmits a first unlock event associated with the data element to each of the other data access nodes, where the first unlock event includes an indication of the modification made to the data element by the first data access node. The second data access node determines whether the second request to modify the data element conflicts with the modification made to the data element by the first data access node and modifies the data element based upon the second request to modify, if the second request to modify does not conflict with the modification made to the data element by the first data access node.

The invention, in another aspect, features a system for distributed data synchronization and conflict resolution. The system includes a plurality of data access nodes connected to each other and one or more data centers coupled to at least some of the data access nodes. A first data access node receives a first request to modify a data element stored in a data center and transmits a first lock event associated with the data element to each of the other data access nodes. A second data access node receives a second request to modify the data element at substantially the same time as the first request to modify is received and transmits a second lock event associated with the data element to each of the other data access nodes. The system determines that the first data access node has priority to modify the data element. The first data access node modifies the data element based upon the first request to modify and transmits a first unlock event associated with the data element to each of the other data access nodes, where the first unlock event includes an indication of the modification made to the data element by the first data access node. The second data access node determines whether the second request to modify the data element conflicts with the modification made to the data element by the first data access node and modifies the data element based upon the second request to modify, if the second request to modify does not conflict with the modification made to the data element by the first data access node.

The invention, in another aspect, features a computer program product, tangibly embodied in a non-transitory computer readable storage device, for distributed data synchronization and conflict resolution. The computer program product includes instructions operable to cause a system comprising a plurality of data access nodes connected to each other and one or more data centers coupled to at least some of the data access nodes to receive, at a first data access node, a first request to modify a data element stored in a data center and transmit, by the first data access node, a first lock event associated with the data element to each of the other data access nodes. The computer program product includes instructions operable to cause a second data access node to receive a second request to modify the data element at substantially the same time as the first request to modify is received and transmit a second lock event associated with the data element to each of the other data access nodes. The computer program product includes instructions operable to cause the system to determine that the first data access node has priority to modify the data element. The computer program product includes instructions operable to cause the first data access node to modify the data element based upon the first request to modify and transmit a first unlock event associated with the data element to each of the other data access nodes, where the first unlock event includes an indication of the modification made to the data element by the first data access node. The computer program product includes instructions operable to cause the second data access node to determine whether the second request to modify the data element conflicts with the modification made to the data element by the first data access node and modify the data element based upon the second request to modify, if the second request to modify does not conflict with the modification made to the data element by the first data access node.

Any of the above aspects can include one or more of the following features. In some embodiments, the first data access node is determined to have priority over the second data access node to modify the data element based upon formation characteristics of the connection between the first data access node and the second data access node. In some embodiments, the formation characteristics include an indication that the second access node initiated establishment of the connection between the first data access node and the second data access node.

In some embodiments, the second data access node transmits an acknowledgment of the first lock event to the first data access node upon receiving the first lock event. In some embodiments, the first data access node queues the second lock event upon receiving the second lock event.

In some embodiments, the second data access node transmits a second unlock event associated with the data element to each of the other data access nodes, where the second unlock event includes an indication of the modification made to the data element by the second data access node. In some embodiments, if the second request to modify does conflict with the modification made to the data element by the first data access node, the second data access node transmits a second unlock event associated with the data element to each of the other data access nodes, where the second unlock event includes an indication of no modification made to the data element by the second data access node.

In some embodiments, the first data access node and the second data access node transmit lists of known data access nodes to each other upon establishment of the connection between the first data access node and the second data access node. In some embodiments, each list of known data access nodes includes identification of data access nodes to which the node that transmitted the list is connected. In some embodiments, the node receiving the list establishes a connection with each of the data access nodes on the list with which the receiving node is not already connected.

In some embodiments, the first data access node determines that a connection to a third data access node is interrupted and transmits an indication of the interrupted connection to the other data access nodes. In some embodiments, if the second data access node remains connected to the third data access node, the method further comprising transmitting, by the second data access node, a message to the other data access nodes that the second data access node is a proxy for the first data access node. In some embodiments, the distributed data storage system further comprises a plurality of synchronization nodes that relay communications between data access nodes coupled to different data centers.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
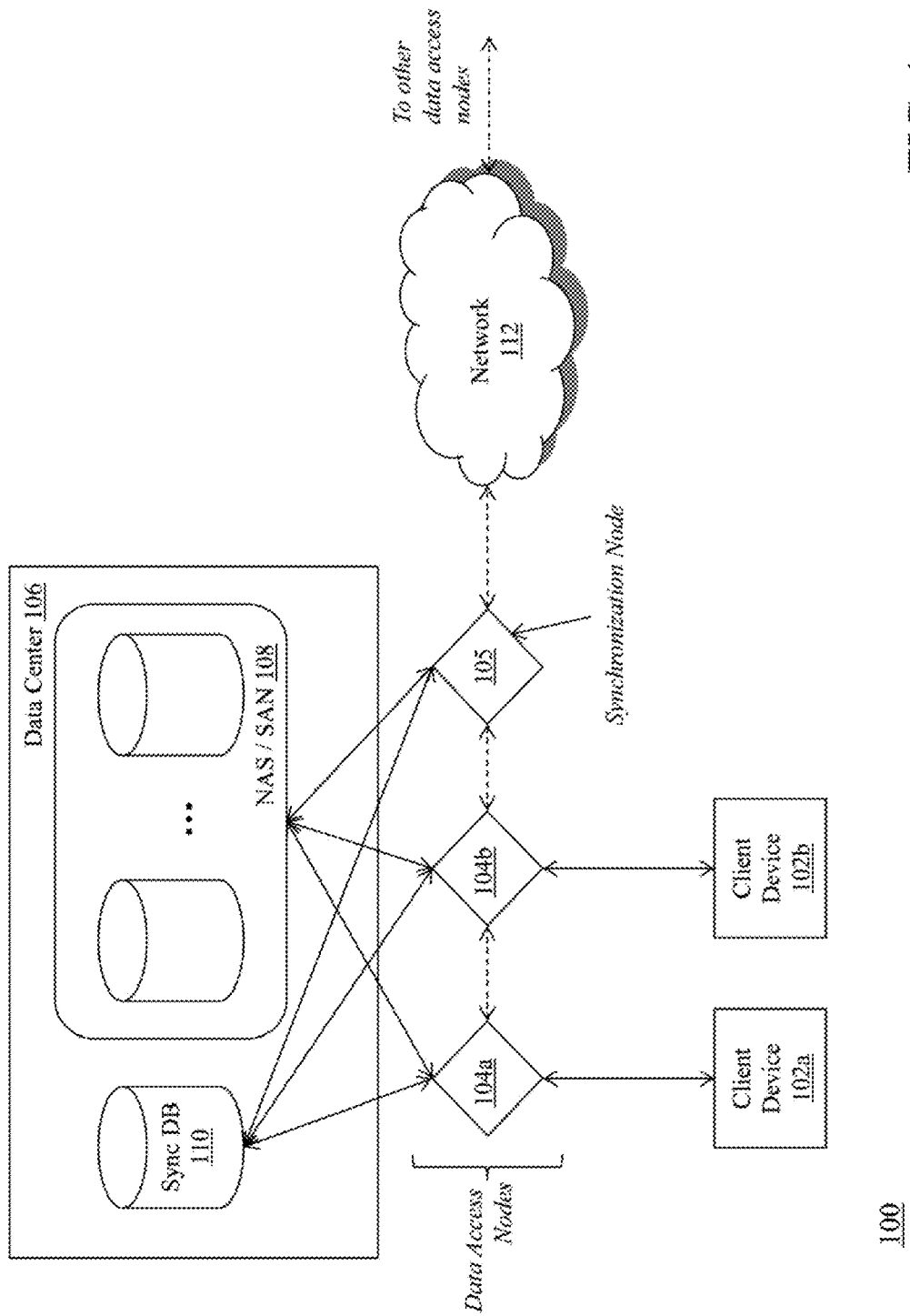
FIG. 1 is a block diagram of a system for distributed data synchronization and conflict resolution.

FIG. 1 is a block diagram of a system 100 for distributed data synchronization and conflict resolution. The system 100 includes a plurality of client devices 102a-102b, a plurality of data access nodes 104a-104b, a synchronization node 105, a data center 106 including a network-attached storage (NAS)/storage area network (SAN) 108 computing device and a synchronization database 110, and a network 112.

The plurality of client devices 102a-102b connect to the data access nodes 104a-104b (e.g., via a network) to access the data stored in the data center 106. Exemplary client devices include desktop computers, laptop computers, tablets, mobile devices, smartphones, and internet appliances. It should be appreciated that other types of computing devices that are capable of connecting to the data access nodes 104a-104b can be used without departing from the scope of invention.

The plurality of data access nodes 104a-104b communicate with the client devices 102a-102b to receive requests to access and/or modify the data stored in the data center 104, and retrieve data from the data center 104 (via the NAS/SAN device 108) in response to the requests from the client devices. The data access nodes 104a-104b are hardware and/or software modules (e.g., deployed on a computing device). The data access nodes 104-104b are further coupled with each other in order to resolve data synchronization and conflict resolution tasks, as will be described in greater detail below. The data access nodes 104-104b are also coupled to the synchronization database 110 in order to track and manage data synchronization information as data requests are processed.

The synchronization node 105 communicates with the data access nodes 104a-104b, the NAS/SAN device 108, and the synchronization database 110. The synchronization node 105 is also coupled to other data access nodes that may be located in a different location via network 112. In this way, several data centers can be linked together to provide the data synchronization and conflict resolution techniques described herein to many different client devices, as part of a distributed data architecture.

The data center 106 is a location used to house computer systems and related components, such as the NAS/SAN device 108 and the synchronization database 110. Typical data centers include backup power systems, environmental controls, a plurality of network communication connections, security apparatuses, and the like.

The NAS/SAN device 108 is a computing device coupled to a plurality of data storage modules (e.g., hard drives), arranged for the purpose of fast and efficient data storage and retrieval. It should be appreciated that the NAS/SAN device 108 can be configured using a variety of file-based protocols (e.g., Network File System (NFS), Server Message Block/Common Internet File System (SMB/CIFS), File Transfer Protocol (FTP), Apple Filing Protocol (AFP)) and hardware architectures without departing from the scope of invention. Further, in some embodiments, the NAS/SAN device 108 can be implemented as a SAN-only configuration, a NAS-only configuration or a SAN-NAS hybrid configuration. Also, clustering techniques can be used to distribute the data across multiple devices (e.g., striping) for storage purposes.

The synchronization database 110 in the data center 106 stores data used by the data access nodes 104a-104b and the synchronization node 105 to track and manage data synchronization information as data requests are processed. The database 110 can reside on a separate computing device from other elements in the data center 104 and, in some embodiments, the database 110 is in a different location than the data center 104. An example database that can be used with the system 100 is MySQL™ available from Oracle Corp. of Redwood City, Calif. It should be appreciated that other types of databases can be used with the system 100 without departing from the scope of invention.

Figure 2:
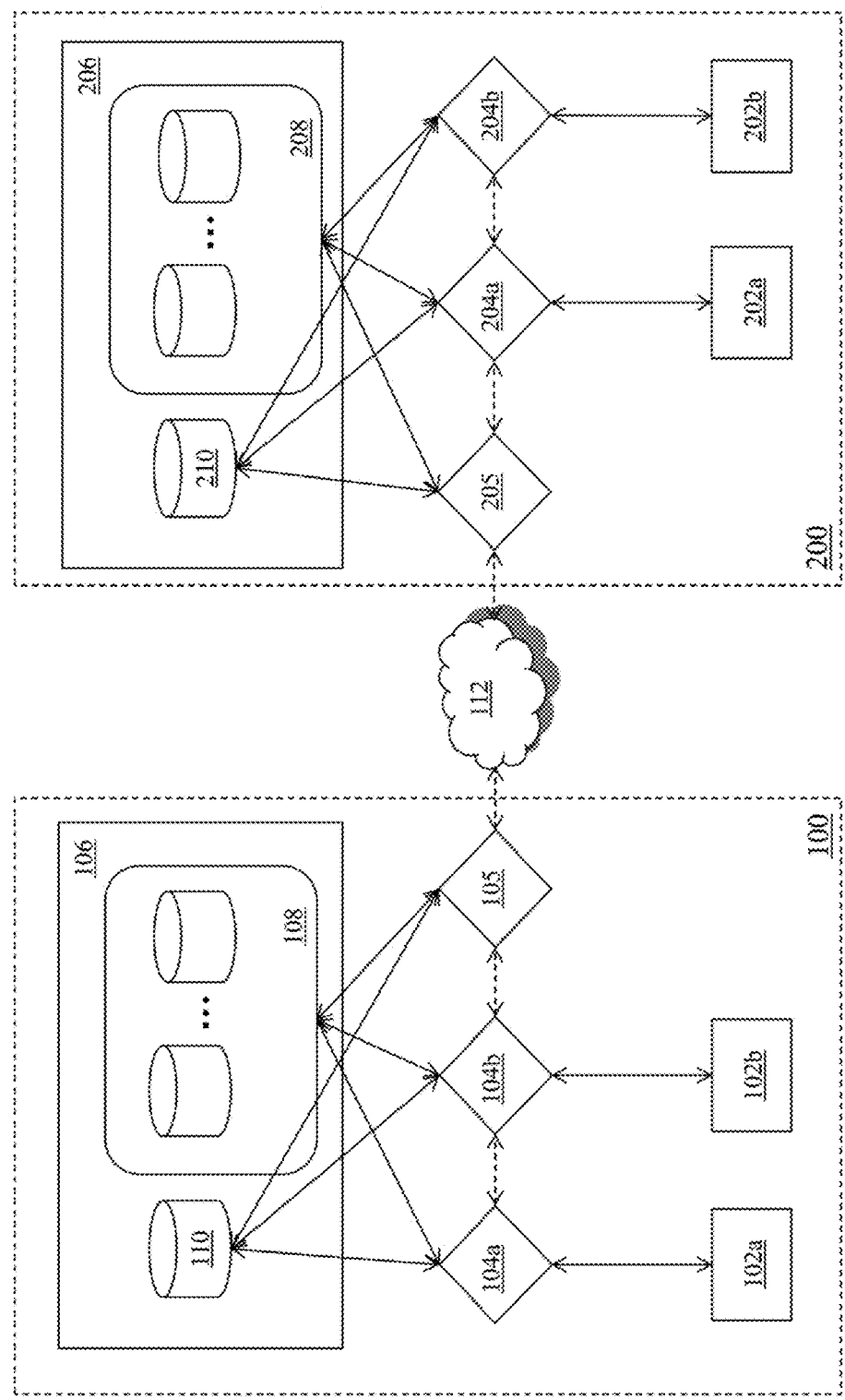
FIG. 2 is a block diagram of a system for distributed data synchronization and conflict resolution.

The network 112 couples the synchronization node 105 to other data access nodes (as shown in FIG. 2 described below). The network 104 may be a local network, such as a LAN, or a wide area network, such as the Internet or the World Wide Web.

In some embodiments, the functionality of the data access nodes 104a-104b and the synchronization node 105 is distributed among a plurality of computing devices. It should be appreciated that any number of computing devices, arranged in a variety of architectures, resources, and configurations (e.g., cluster computing, virtual computing, cloud computing) can be used without departing from the scope of the invention. It should also be appreciated that, in some embodiments, the functionality of the data access nodes 104a-104b and the synchronization node 105 can be distributed such that any of the data access nodes 104a-104b and the synchronization node 105 are capable of performing any of the functions described herein without departing from the scope of the invention. For example, in some embodiments, the data access nodes 104a-104b and the synchronization node 105 can be merged into a single node. In some embodiments, the synchronization node 105 can communicate with client devices 102a-102b to perform the data synchronization and conflict resolution techniques described herein.

FIG. 2 is a block diagram of a system for distributed data synchronization and conflict resolution, where multiple systems configured as described above with respect to FIG. 1 are coupled together via network 112. As shown in FIG. 2, the synchronization node 105 of system 100 is connected to a synchronization node 205 of system 200 via the network 112. The components of system 200 reflect those previously described in FIG. 1. For example, system 200 includes a plurality of client devices 202a-202b, a plurality of data access nodes 204a-204b, a synchronization node 205, a data center 206, a NAS/SAN device 208, and a synchronization database 210. By coupling the systems 100 and 200 together, it provides an advantage such that, e.g., client device 102a and client device 202b can access the same data resources and data access nodes 104a, 104b, 204a, 204b can perform data synchronization and conflict resolution techniques described herein for multiple data centers (e.g., in a distributed data system architecture).

Figure 3A:
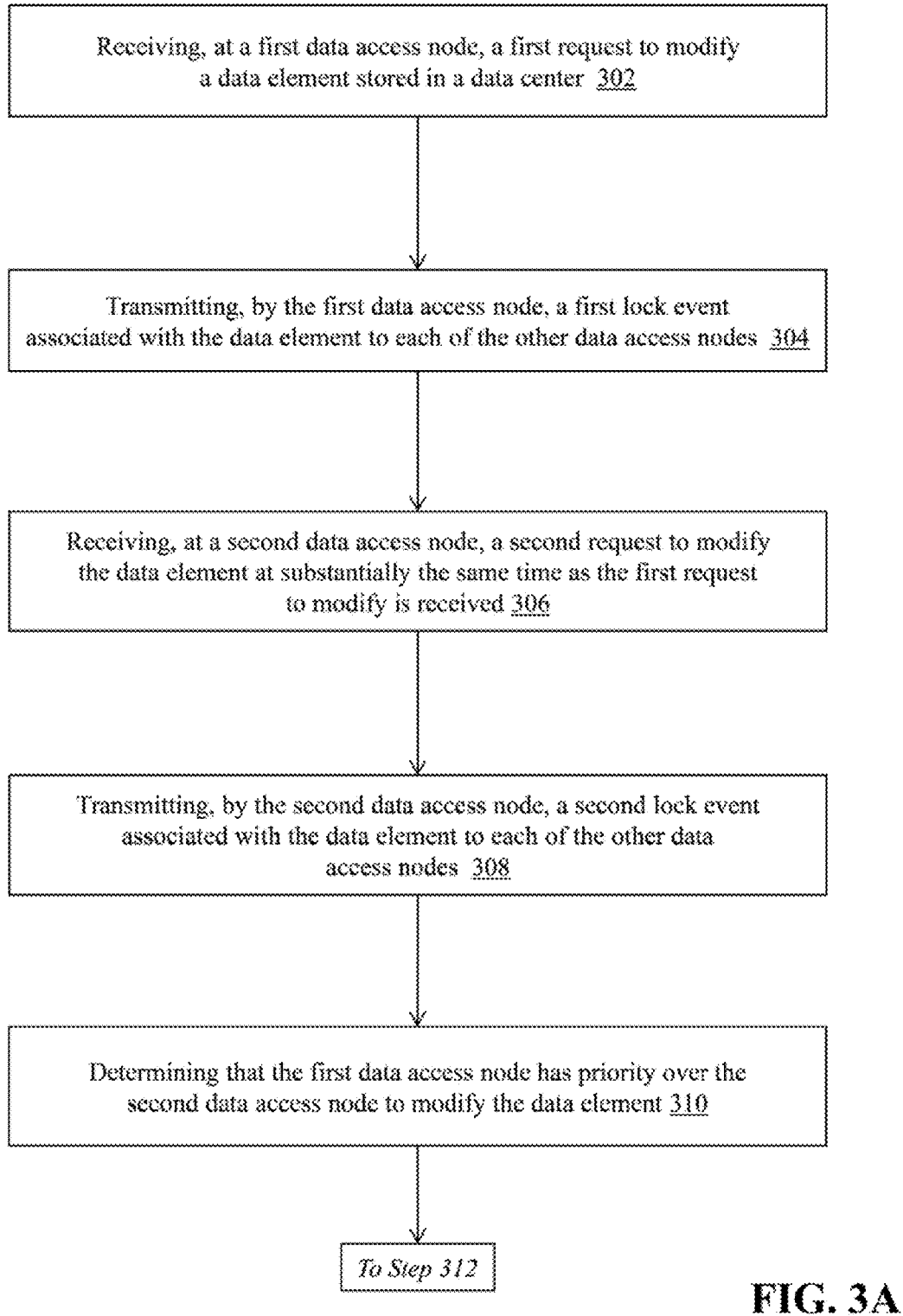
FIGS. 3A-3B are flow diagrams of a method for distributed data synchronization and conflict resolution.
Figure 3B:
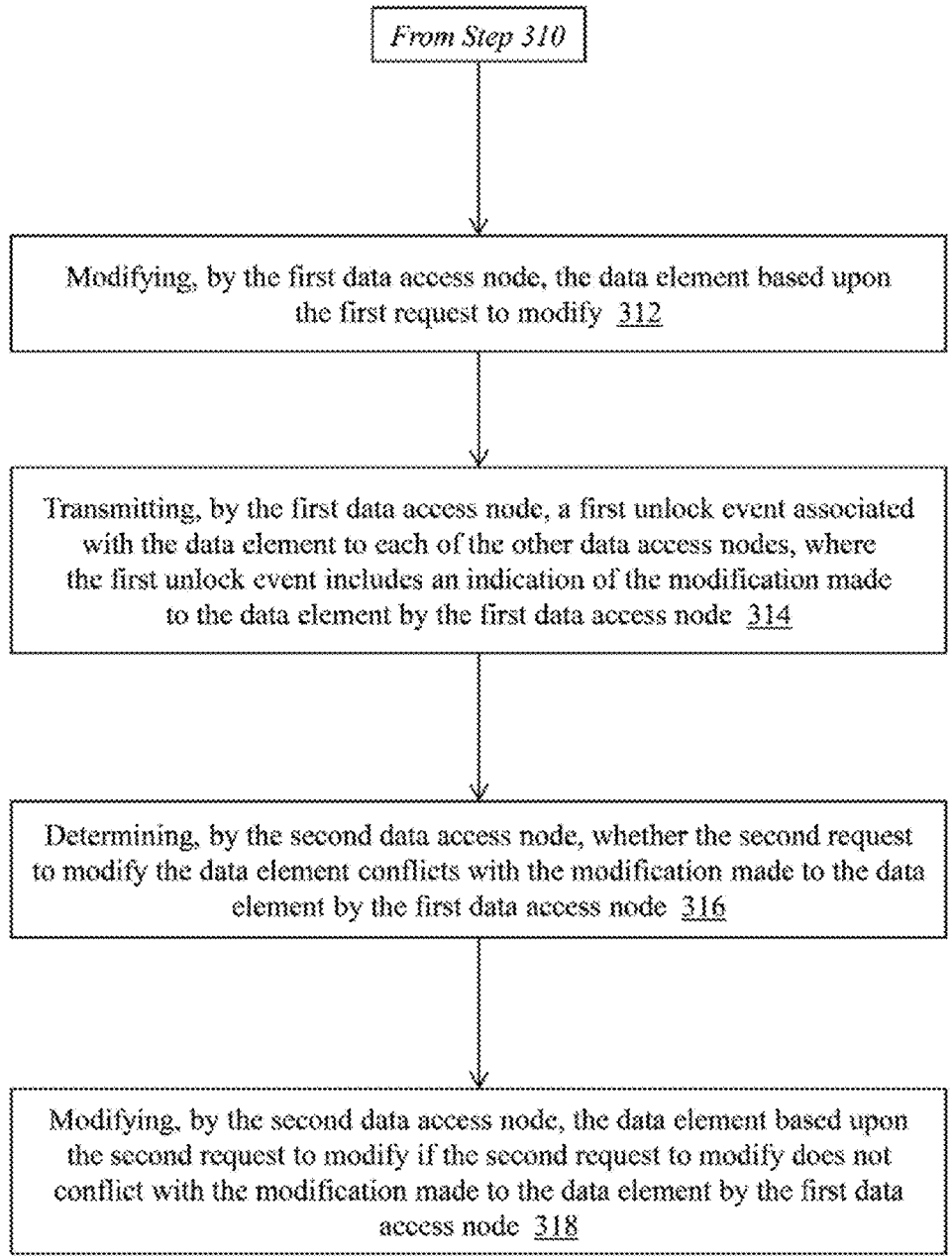

FIGS. 3A-3B are flow diagrams of a method for distributed data synchronization and conflict resolution, using the system 100 of FIG. 1. It should be appreciated that the method of FIGS. 3A-3B as described with respect to FIG. 1 is equally applicable in the context of the distributed data system architecture shown in FIG. 2.

A first data access node (e.g., data access node 104a) receives (302) a first request to modify a data element stored in a data center (e.g., data center 106). For example, a user at client device 102a may request access to a file stored in the NAS/SAN device 108 at the data center 106 to make changes to the file. Upon receiving the request, the first data access node 104a transmits (304) a first lock event associated with the data element to each of the other data access nodes (e.g., data access node 104b). For example, the lock event is a message indicating the identity of the dataset or file that relates to the modification request and, in some cases, includes other information such as identification of the client device and/or user that submitted the modification request, a timestamp associated with the request, and the like.

It should be appreciated that using the system depicted in FIG. 2, the first lock event can be transmitted by the first data access node 104a to the synchronization node 105 as well, and the synchronization node 105 can transmit the lock event to other data access nodes (e.g., 204a, 204b) via synchronization node 205.

A second data access node (e.g., data access node 104b) receives (306) a second request to modify the same data element as identified in the first request to modify at substantially the same time as the first request to modify is received by the first data access node 104a. For example, a user at client device 102b may request access to make changes to the same file stored in the NAS/SAN device 108 at the data center 106 for which the user at client device 104a has also requested access. The request generated by client device 102b may arrive at the data access node 104b at substantially the same time as the request generated by client device 102a arrives at the data access node 104a. Upon receiving the request, the second data access node 104b transmits (308) a second lock event associated with the data element to each of the other data access nodes (e.g., data access node 104a).

Because the modification requests relate to the same data element and are received at the same time by the respective data access nodes 104a-104b, and the nodes 104a-104b issue the related lock events at the same time, the system 100 must determine which data access node should have priority over the other for the purpose of making changes to the data element.

The system 100 advantageously determines data access node priority at the time the data access nodes initially connect to each other. For example, when the first data access node 104a and the second data access node 104b come online, the nodes 104a-104b contact each other to establish a secure connection with each other (e.g., as part of a handshake routine). In some embodiments, the nodes 104a-104b are pre-configured to know about other data access nodes in the system 100 through a configuration file or other similar technique.

In a preferred embodiment, the data access nodes maintain persistent connections to each other data access node on the network and, as a result, each node is continually aware of the other nodes' state. Therefore, changes to a data element made by one data access node can be directly shared with each other node without having to rely on proliferation through multiple nodes.

During the connection handshake, one data access node is defined as the initiating node and the other data access node is defined as the receiving node. It should be appreciated that any number of techniques can be used to determine how to define each data access node as either the initiating node or the receiving node during the handshake routine. In one example, the second data node 104b may initiate the connection by transmitting a connection request message to the first data access node 104a. Therefore, in this example, the second data node 104b is considered as the initiating node and the first data access node 104a is considered the receiving node.

Each data access node maintains a list of other known data access nodes. The list includes information such as an identity of each other known data access node (e.g., node name, IP address, and the like) and a connection relationship with the other known nodes—whether the host node initiated the connection with another node and is therefore considered the initiating node in the relationship, or whether the host node received the connection initiation from another node and is therefore considered the receiving node in the relationship.

In some embodiments, the initiating node provides the receiving node with a list of other data access nodes that are known to the initiating node. The receiving node can use the list of other nodes to expand its own list of known nodes. Similarly, the receiving node provides the initiating node with a list of other nodes that are known to the receiving node. Using these lists, each of the initiating node and the receiving node can establish secure connections to each of the other data access nodes known in the system 100.

The connection relationship is used by the individual data access nodes to determine how to resolve lock events. Continuing with the above example, the second data access node 104b transmits a lock event for a data element to the first data access node 104a and the first data access node 104b transmits a lock event for the same data element at substantially the same time to the second data access node 104b. The lock event includes information such as the data element(s) to be locked (e.g., filename), the type of lock to be obtained (e.g., shared or exclusive), and a time-to-live (TTL) specifying a length of time for the lock to remain in place. In some embodiments, locks can be released by a data access node before a TTL is reached by transmitting an unlock event and then transmitting a duplicate lock event with an updated TTL (e.g., resetting the TTL start time to the current time).

Because the second data access node 104b initiated the connection with the first data access node 104a when the connection was established, each of the nodes 104a-104b determines (310) that the first data access node 104a has priority over the second data access node 104b to modify the data element. The second data access node 104b cedes data modification priority to the first data access node 104a, and transmits an acknowledgment of the first node's lock event back to the first node 104a.

Similarly, the first data access node 104a uses its list to analyze its connection relationship with the second node 104b and determines that, as the receiving node, the first node 104a has priority to modify the data element over the second node 104b. Upon receiving the lock event from the second node 104b, the first node 104a queues the lock event from the second node 104b.

Because the first data access node 104a has modification priority and holds the lock on the data element, the first node 104a modifies (312) the data element based upon the first request to modify. For example, the first node 104a applies changes to the data element (e.g., data additions, updates, deletions, and the like) based upon the request to modify received from the client device 102a. When the first node 104a has completed the modification, the first node 104a transmits (314) an unlock event associated with the data element to each of the other data access nodes. The unlock event includes an indication of the modification made to the data element by the first data access node 104a. The first node 104a also transmits a notification to the client device 102a that the modification request was successfully executed.

Upon receiving the unlock event, the second data access node 104b determines (316) whether the second request to modify the data element (as received from the client device 102b) conflicts with the modification made to the data element by the first data access node 104a. For example, if the modification made by the first node 104a updated a particular data field in a document and the request to modify submitted by the second node 104b intends to delete the same data field, the second node 104b can determine that the second request to modify conflicts with the first modification and therefore the second modification should not be allowed. It should be appreciated that other types of data conflicts (e.g., uniqueness conflicts, update conflicts, deletion conflicts) can be determined by the system 100 without departing from the scope of invention.

If the second data access node 104b determines that the second request to modify conflicts with the first modification, the second data access node 104b transmits an unlock event to each of the other data access nodes in the system 100 to resolve the lock event transmitted earlier. In addition, the second node 104b transmits a notification to the client device 102b that the modification request failed.

If the second data access node 104b determines that the second request to modify does not conflict with the first modification, the second node 104b modifies (318) the data element based upon the second request to modify. The second node 104b then transmits an unlock event to each of the other data access nodes to resolve the lock event transmitted earlier, and the second node 104b also transmits a notification to the client device 102b that the modification request was successfully executed.

Figure 4:
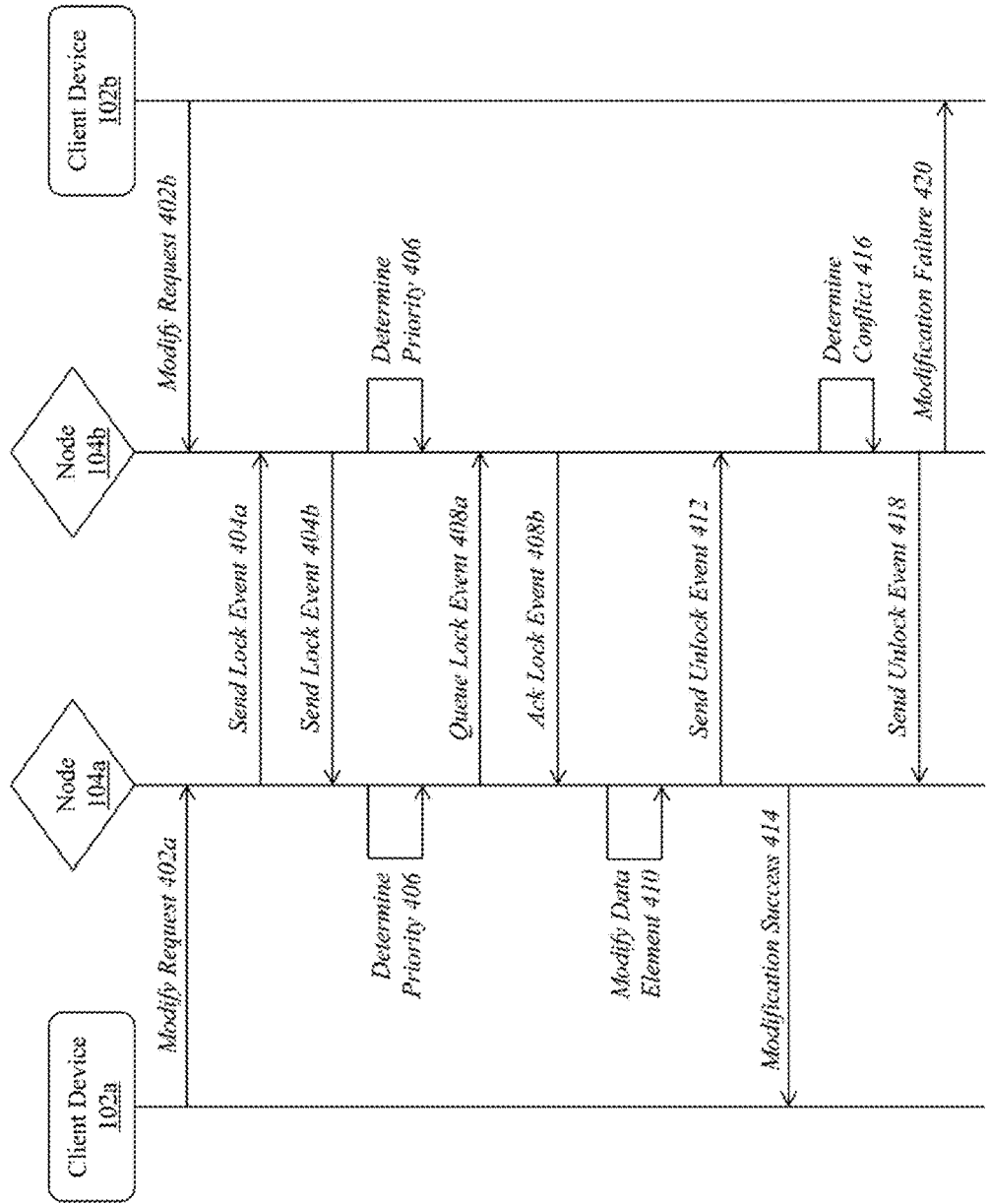
FIG. 4 is a ladder diagram of a method for distributed data synchronization and conflict resolution where a conflict exists between two competing modification requests.

FIG. 4 is a ladder diagram of a method for distributed data synchronization and conflict resolution where a conflict exists between two competing modification requests, using the system 100 of FIG. 1. It should be appreciated that the method of FIG. 4 as described with respect to FIG. 1 is equally applicable in the context of the distributed data system architecture shown in FIG. 2.

As shown in FIG. 4, client device 102a transmits (402a) a request to modify a data element to data access node 104a. At substantially the same time, client device 102b transmits (402b) a request to modify the same data element to data access node 104b. Data access node 104a sends (404a) a lock event to data access node 104b, and node 104b also sends (404b) a lock event to node 104a.

Each data access node 104a, 104b determines (406) modification priority, using the techniques described previously. Because data access node 104b initiated the secure connection with data access node 104a at startup, node 104a has priority over node 104b. Data access node 104a queues (408a) the lock event received from data access node 104b, and node 104b transmits (408b) an acknowledgment to node 104a of the lock event received from node 104a.

Data access node 104a modifies (410) the data element and sends (412) an unlock event to node 104b. Data access node 104a also transmits (414) a modification success notification to client device 102a.

Data access node 104b determines (416) that a conflict exists between the modification made by data access node 104a and the request to modify that node 104b received from client device 102b. Data access node 104b sends (418) an unlock event to node 104a, and transmits (420) a modification failure notification to client device 102b.

Figure 5:
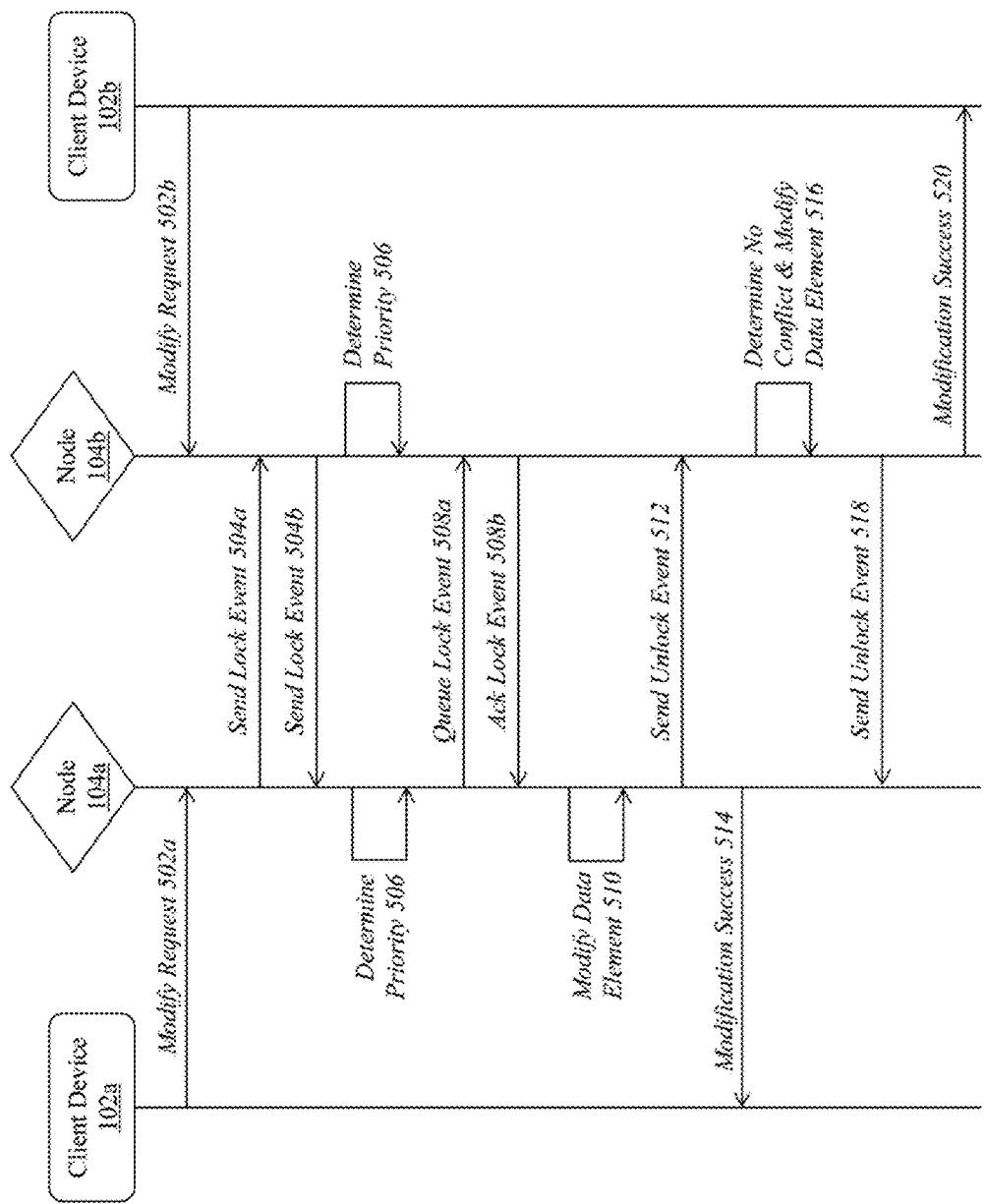
FIG. 5 is a ladder diagram of a method for distributed data synchronization and conflict resolution where no conflict exists between two competing modification requests.

FIG. 5 is a ladder diagram of a method for distributed data synchronization and conflict resolution where no conflict exists between two competing modification requests. It should be appreciated that the method of FIG. 4 as described with respect to FIG. 1 is equally applicable in the context of the distributed data system architecture shown in FIG. 2.

As shown in FIG. 5, client device 102a transmits (502a) a request to modify a data element to data access node 104a. At substantially the same time, client device 102b transmits (502b) a request to modify the same data element to data access node 104b. Data access node 104a sends (504a) a lock event to data access node 104b, and node 104b also sends (504b) a lock event to node 104a.

Each data access node 104a, 104b determines (506) modification priority, using the techniques described previously. Because data access node 104b initiated the secure connection with data access node 104a at startup, node 104a has priority over node 104b. Data access node 104a queues (508a) the lock event received from data access node 104b, and node 104b transmits (508b) an acknowledgment to node 104a of the lock event received from node 104a.

Data access node 104a modifies (510) the data element and sends (512) an unlock event to node 104b. Data access node 104a also transmits (514) a modification success notification to client device 102a.

Data access node 104b determines (516) that no conflict exists between the modification made by data access node 104a and the request to modify that node 104b received from client device 102b, and node 104b modifies the data element. Data access node 104b sends (518) an unlock event to node 104a, and transmits (520) a modification success notification to client device 102b.

In the event that a data access node goes offline or has its connection to other data access nodes interrupted, the system 100 can continue to perform data synchronization and conflict resolution until the interrupted node is restored. For example, each data access node can be configured to analyze connections to other nodes periodically and determine whether any of its connections are offline or interrupted. If a data access node recognizes that one of its connections is no longer available, the data access node transmits a message to each of the other data access nodes to update their node lists and remove the offline connection.

In some embodiments, if a first data access node receives a message from a second data access node that a third data access node is offline, the first data access node can check with the third node to determine whether the third node is in fact offline. If the first node can still reach the third node, the first node can send a message to the other data access nodes that the first node can act as a proxy between the second node and the third node, until the connection is re-established between the second and third nodes.

In some embodiments, the system 100 utilizes techniques to perform zero-knowledge de-duplication of files and/or datasets stored in the various data centers. For example, when a client device 102a requests for a first file to be stored in a data center 106 via data access node 104a, the node 104a generates a hash value of the file content and assigns the generated hash value as a file identifier (e.g., ID key) in the file metadata. Then, if another client device 202a requests storage of a copy of the first file in another data center 206 via data access node 204a, the node 204a generates a hash value of the file content and assigns the generated hash value as a file identifier (e.g., ID key) in the file metadata. The data access node 204a can compare the ID key for the copy of the first file against the ID keys for other files in the data centers 106, 206. If the node 204a determines that the first file is already stored (e.g., in data center 106) with the same ID key, then the node 204a can decide to not store the copy of the first file because it is duplicative of the first file. Using a hash value as the ID key increases speed and efficiency of the de-duplication process, as the system 100 needs only to perform a comparison of the ID key to determine whether a file is duplicative.

The zero-knowledge deduplication techniques are particularly advantageous in the context of managing versioned files across multiple data centers. For example, if a client device 102a requests storage of an updated version of a file that is already stored in a data center via data access node 104a, the node 104a generates a hash value of the updated version content (which is different than the previous version of the file) and assigns the hash value as a file identifier in the metadata for the updated version. In this way, both versions of the file are stored separately in the data center and can be accessed independently. In addition, the system 100 can utilize a different hash value for encryption purposes so that zero-knowledge de-duplication can still be performed without implicating the security of the file.

In some embodiments, the system 100 can be configured to perform as a cache-as-needed content delivery network (CDN) across the data centers. For example, a client device 102a requests a file from data center 106 via node 104a. The node 104a determines that the requested file is not currently stored in data center 106. Instead, data center 106 includes a reference (e.g., pointer) for the file that points to the file as being stored on one or more other data centers (e.g., data center 206). The node 104a connects to data center 206 (via network 112) and retrieves the requested file for the client device 102a. The node 104a also stores a copy of the requested file in the local data center 106 for serving future requests. In some embodiments, where a requested file is stored in multiple data centers, the node 104a also determines which data center hosting the requested file is closest to the node 104a/client device 102a and can retrieve the requested file from the closest data center—thereby providing a faster response time to the client device 102a.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein.

What is claimed is:

1. A computerized method for data synchronization and conflict resolution in a distributed data storage system, wherein the distributed data storage system comprises a plurality of data access nodes connected to each other and one or more data centers coupled to at least some of the data access nodes, the method comprising:
receiving, at a first data access node, a first request to modify a data element stored in a data center;
transmitting, by the first data access node, a first lock event associated with the data element to each of the other data access nodes;
receiving, at a second data access node, a second request to modify the data element at the same time as the first request to modify is received;
transmitting, by the second data access node, a second lock event associated with the data element to each of the other data access nodes;
determining that the first data access node has priority to modify the data element, wherein the priority is based upon an indication that the second data access node initiated establishment of the connection between the first data access node and the second data access node at a time when the second data access node joined the plurality of data access nodes;
modifying, by the first data access node, the data element based upon the first request to modify;

transmitting, by the first data access node, a first unlock event associated with the data element to each of the other data access nodes, wherein the first unlock event includes an indication of the modification made to the data element by the first data access node;

determining, by the second data access node, whether the second request to modify the data element conflicts with the modification made to the data element by the first data access node; and modifying, by the second data access node, the data element based upon the second request to modify if the second request to modify does not conflict with the modification made to the data element by the first data access node.

2. The method of claim 1, further comprising transmitting, by the second data access node, an acknowledgment of the first lock event to the first data access node upon receiving the first lock event.

3. The method of claim 1, further comprising queuing, by the first data access node, the second lock event upon receiving the second lock event.

4. The method of claim 1, further comprising transmitting, by the second data access node, a second unlock event associated with the data element to each of the other data access nodes, wherein the second unlock event includes an indication of the modification made to the data element by the second data access node.

5. The method of claim 1, if the second request to modify does conflict with the modification made to the data element by the first data access node, the method further comprising:

transmitting, by the second data access node, a second unlock event associated with the data element to each of the other data access nodes, wherein the second unlock event includes an indication of no modification made to the data element by the second data access node.

6. The method of claim 1, wherein the first data access node and the second data access node transmit lists of known data access nodes to each other upon establishment of the connection between the first data access node and the second data access node.

7. The method of claim 6, wherein each list of known data access nodes includes identification of data access nodes to which the node that transmitted the list is connected.

8. The method of claim 7, wherein the node receiving the list establishes a connection with each of the data access nodes on the list with which the receiving node is not already connected.

9. The method of claim 1, further comprising:

determining, by the first data access node, that a connection to a third data access node is interrupted; and transmitting, by the first data access node, an indication of the interrupted connection to the other data access nodes.

10. The method of claim 9, if the second data access node remains connected to the third data access node, the method further comprising transmitting, by the second data access node, a message to the other data access nodes that the second data access node is a proxy for the first data access node.

11. The method of claim 1, wherein the distributed data storage system further comprises a plurality of synchronization nodes that relay communications between data access nodes coupled to different data centers.

12. A system for distributed data synchronization and conflict resolution, the system comprising:

a plurality of data access nodes connected to each other and executing on one or more computing devices; and one or more data center computing devices coupled to at least some of the data access nodes, the system configured to:

receive, at a first data access node, a first request to modify a data element stored in a data center computing device;

transmit, by the first data access node, a first lock event associated with the data element to each of the other data access nodes;

receive, at a second data access node, a second request to modify the data element at the same time as the first request to modify is received;

transmit, by the second data access node, a second lock event associated with the data element to each of the other data access node;

determine that the first data access node has priority to modify the data element, wherein the priority is based upon an indication that the second data access node initiated establishment of the connection between the first data access node and the second data access node at a time when the second data access node joined the plurality of data access nodes;

modify, by the first data access node, the data element based upon the first request to modify;

transmit, by the first data access node, a first unlock event associated with the data element to each of the other data access nodes, wherein the first unlock event includes an indication of the modification made to the data element by the first data access node;

determine, by the second data access node, whether the second request to modify the data element conflicts with the modification made to the data element by the first data access node; and modify, by the second data access node, the data element based upon the second request to modify if the second request to modify does not conflict with the modification made to the data element by the first data access node.

13. The system of claim 12, wherein the second data access node transmits an acknowledgment of the first lock event to the first data access node upon receiving the first lock event.

14. The system of claim 12, wherein the first data access node queues the second lock event upon receiving the second lock event.

15. The system of claim 12, wherein the second data access node transmits a second unlock event associated with the data element to each of the other data access nodes and the second unlock event includes an indication of the modification made to the data element by the second data access node.

16. The system of claim 12, if the second request to modify does conflict with the modification made to the data element by the first data access node:

the second data access node transmits a second unlock event associated with the data element to each of the other data access nodes, wherein the second unlock event includes an indication of no modification made to the data element by the second data access node.

17. The system of claim 12, wherein the first data access node and the second data access node transmit lists of known data access nodes to each other upon establishment of the connection between the first data access node and the second data access node.

18. The system of claim 17, wherein each list of known data access nodes includes identification of data access nodes to which the node that transmitted the list is connected.

19. The system of claim 18, wherein the node receiving the list establishes a connection with each of the data access nodes on the list with which the receiving node is not already connected.

20. The system of claim 12, wherein:
the first data access node determines that a connection to a third data access node is interrupted; and
the first data access node transmits an indication of the interrupted connection to the other data access nodes.

21. The system of claim 20, if the second data access node remains connected to the third data access node, the second data access node transmits a message to the other data access nodes that the second data access node is a proxy for the first data access node.

22. The system of claim 12, wherein the distributed data storage system further comprises a plurality of synchronization nodes executing on one or more computing devices that relay communications between data access nodes coupled to different data center computing devices.

23. A computer program product, tangibly embodied in a non-transitory computer readable storage device, for distributed data synchronization and conflict resolution, the computer program product including instructions operable to cause a system comprising a plurality of data access nodes connected to each other and one or more data centers coupled to at least some of the data access nodes to:
receive, at a first data access node, a first request to modify a data element stored in a data center;
transmit, by the first data access node, a first lock event associated with the data element to each of the other data access nodes;
receive, at a second data access node, a second request to modify the data element at the same time as the first request to modify is received;
transmit, by the second data access node, a second lock event associated with the data element to each of the other data access nodes;
determine that the first data access node has priority to modify the data element, wherein the priority is based upon an indication that the second data access node initiated establishment of the connection between the first data access node and the second data access node at a time when the second data access node joined the plurality of data access nodes;
modify, by the first data access node, the data element based upon the first request to modify;
transmit, by the first data access node, a first unlock event associated with the data element to each of the other data access nodes, wherein the first unlock event includes an indication of the modification made to the data element by the first data access node;
determine, by the second data access node, whether the second request to modify the data element conflicts with the modification made to the data element by the first data access node; and
modify, by the second data access node, the data element based upon the second request to modify if the second request to modify does not conflict with the modification made to the data element by the first data access node.

\* \* \* \* \*

UNITED STATES PATENT AND TRADEMARK OFFICE
CERTIFICATE OF CORRECTION

PATENT NO.         : 9,208,167 B1
APPLICATION NO.    : 14/477752
DATED              : December 8, 2015
INVENTOR(S)        : Dagan A. Henderson It is certified that error appears in the above-identified patent and that said Letters Patent is hereby corrected as shown below:

In The Claims

Column 14, line 65, Claim 18:

add a space between the words --of-- and --known--.

Signed and Sealed this
Twenty-sixth Day of April, 2016

Michelle K. Lee
*Director of the United States Patent and Trademark Office*